(12) United States Patent
Vincent et al.

(10) Patent No.: US 9,941,822 B2
(45) Date of Patent: Apr. 10, 2018

(54) GENERATOR AND METHOD FOR CONVERTING VIBRATIONAL ENERGY INTO ELECTRICAL ENERGY

(71) Applicant: Perpetuum Ltd., Southampton (GB)

(72) Inventors: David Robert Vincent, Ferndown Dorest (GB); Adam Wasenczuk, Hants (GB)

(73) Assignee: Perpetuum Ltd., Southhampton (GB)

( * ) Notice: Subject to any disclaimer, the term of this patent is extended or adjusted under 35 U.S.C. 154(b) by 134 days.

(21) Appl. No.: 14/442,675

(22) PCT Filed: Nov. 13, 2013

(86) PCT No.: PCT/EP2013/073754
§ 371 (c)(1),
(2) Date: May 13, 2015

(87) PCT Pub. No.: WO2014/076143
PCT Pub. Date: May 22, 2014

(65) Prior Publication Data
US 2016/0285393 A1 Sep. 29, 2016

(30) Foreign Application Priority Data
Nov. 13, 2012 (GB) .................................. 1220417.8

(51) Int. Cl.
*H01L 41/113* (2006.01)
*H02N 2/18* (2006.01)
(Continued)

(52) U.S. Cl.
CPC ............. *H02N 2/188* (2013.01); *F16F 15/03* (2013.01); *H02K 35/00* (2013.01); *H02N 2/186* (2013.01)

(58) Field of Classification Search
CPC ......... H02N 2/188; H02N 2/186; F16F 15/03; H02K 35/00
(Continued)

(56) References Cited

U.S. PATENT DOCUMENTS 3,942,051 A 3/1976 Stevinson et al.
6,291,901 B1 9/2001 Cèfo
(Continued)

FOREIGN PATENT DOCUMENTS

CN 102148587 8/2011
JP S49-80281 U 10/2009
(Continued)

OTHER PUBLICATIONS

EPO Search Report issued for GB1220417.8 dated Mar. 4, 2013.
(Continued)

*Primary Examiner* — Thomas Dougherty
(74) *Attorney, Agent, or Firm* — Colin P. Cahoon; Krista Y. Chan; Carstens & Cahoon, LLP

(57) ABSTRACT

Disclosed is an electromechanical generator for converting mechanical vibrational energy into electrical energy, the electromechanical generator comprising: a mass resiliently connected to a body by a biasing device and adapted to oscillate about an equilibrium point relative to the body with an oscillation amplitude, a transducer configured to convert oscillations of the mass about the equilibrium point relative to the body into electrical energy, and a resilient device disposed between the biasing device and one of the mass and the body, wherein the resilient device is configured to be deformed between the biasing device and the one of the mass and the body only when the oscillation amplitude exceeds a predetermined non-zero threshold amplitude. The resilient device may comprise one of a helical spring, an
(Continued)

O-ring and a spring washer, such as a Belleville washer, a curved disc spring, a wave washer, and a split washer.

20 Claims, 5 Drawing Sheets

(51) Int. Cl.
  *H02K 35/00* (2006.01)
  *F16F 15/03* (2006.01)
(58) Field of Classification Search
  USPC .......................................................... 310/339
  See application file for complete search history.

(56) References Cited

U.S. PATENT DOCUMENTS

| | | | |
|---|---|---|---|
| 7,521,841 B2* | 4/2009 | Clingman | H02N 2/186 310/339 |
| 7,692,366 B2* | 4/2010 | Thiesen | B60C 23/041 310/339 |
| 7,839,058 B1 | 11/2010 | Churchill et al. | |
| 8,525,392 B2* | 9/2013 | Rastegar | H02N 2/186 310/339 |
| 8,541,927 B2* | 9/2013 | Hayamizu | A01K 85/01 310/339 |
| 8,680,750 B2* | 3/2014 | Kang | H02N 2/186 310/339 |
| 8,866,316 B2* | 10/2014 | Wood | H02N 2/188 290/1 R |
| 8,912,710 B2* | 12/2014 | Rastegar | H02N 2/186 310/339 |
| 9,246,414 B2* | 1/2016 | Sakaguchi | H02N 2/188 |
| 2007/0194634 A1 | 8/2007 | Roberts | |
| 2008/0264537 A1 | 10/2008 | Behrends | |
| 2011/0089773 A1 | 4/2011 | Choi | |
| 2011/0193427 A1 | 8/2011 | Lemieux | |
| 2011/0204751 A1* | 8/2011 | Rastegar | H02N 2/186 310/339 |
| 2012/0212097 A1 | 8/2012 | Wasenczuk et al. | |

FOREIGN PATENT DOCUMENTS

| | | |
|---|---|---|
| JP | 2011-69402 A | 4/2011 |
| JP | 2012-135131 A | 7/2012 |
| JP | 4993030 A | 8/2012 |

OTHER PUBLICATIONS

International Search Report issued for PCT/EP2013/073754 dated Apr. 17, 2015.
English machine translation of JP4993030 published Aug. 8, 2012 (27 pages).
English machine translation of JP2012-135131 published Jul. 12, 2012 (15 pages).
English machine translation of JP2011-069402 published on Apr. 7, 2011 (11 pages).
Office Action dated Sep. 1, 2017 for Japanese Patent Application No. 2015-541188 with English translation (13 pages).

* cited by examiner

GENERATOR AND METHOD FOR CONVERTING VIBRATIONAL ENERGY INTO ELECTRICAL ENERGY

The present invention relates to an electromechanical generator for converting mechanical vibrational energy into electrical energy. The present invention also relates to a method of converting mechanical vibrational energy into electrical energy using an electromechanical generator. In particular, the present invention relates to such a device which is a miniature generator capable of converting ambient vibration energy into electrical energy for use, for example, in powering intelligent sensor systems. Such a system can be used in many areas where there is an economical or operational advantage in the elimination of power cables or batteries.

Electromechanical generators for converting mechanical vibrational energy into electrical energy are well known in the art and consist of mechanical resonators with either electromagnetic induction or piezo-electric power transduction. In either case the mechanical resonator consists of a sprung mass. It is known to use an electromechanical generator for harvesting useful electrical power from ambient vibrations, e.g. for powering wireless sensors. Generators with other transduction systems, such as magnetostrictive or electrostatic systems, also are known.

A typical electromechanical generator is a magnet-coil generator which consists of a mechanical spring-mass combination attached to a magnet or coil in such a manner that when the system vibrates, a coil cuts through the flux formed by a magnetic core. The mass which is moved when vibrated typically is mounted on a cantilever beam. The beam can either be connected to the magnetic core, with the coil fixed relative to an enclosure for the device, or vice versa.

The electromechanical generator may, in use, be subjected to a large shock force or vibration that causes the sprung mass to oscillate with excessively large amplitude, with the result that the mass may physically impact upon the device's outer casing or other components at the limits of its travel. While, in theory, it is possible to space the mass further from the casing and other components to accommodate such large amplitudes of oscillation without impacts occurring, this gives the overall device a larger volume, which limits its application in smaller spaces, likely increases its weight, and requires the use of more material to form the casing. If there is no casing, or if the mass is spaced further from the casing and other components to avoid impacts, then the mass may oscillate with excessively large amplitude that causes permanent damage or degradation to the spring, by repeatedly exceeding the limit of proportionality of the spring material. In either case, it may be expected that this impacting or oscillating with excessively large amplitude would reduce the operating lifetime of the electromechanical generator to an unacceptable degree.

Resonant vibration energy harvesters are advantageously designed such that their Q-factor is as high as possible. This is because higher powers can be generated with higher-Q resonators. However, if such a device is situated in an environment where the driving vibration becomes higher in magnitude than expected, or if such a device is subjected to occasional large shock forces, then the amplitude of oscillation of the resonator may become larger than that designed or accommodated for. This oscillation amplitude may cause the resonating mass to impact on the device casing or other components and potentially lead to permanent device damage after prolonged exposure.

Accordingly, there is a need to provide an electromechanical generator that accommodates the possibility that the amplitude of vibration or oscillation of the sprung mass may vary with time, in an intermittent and unpredictable manner, and can accordingly have a reduced possibility of damage from unsafe amplitudes, and thereby an enhanced operating lifetime.

The present invention aims to provide an improved electromechanical generator for converting mechanical vibrational energy into electrical energy which can meet this need.

The present invention also aims to provide a compact electromechanical generator for converting mechanical vibrational energy into electrical energy.

The present invention also aims to provide an improved electromechanical generator for converting mechanical vibrational energy into electrical energy which includes a limiter for the vibration or oscillation amplitude of its mass that does not cause any power loss from the generator when the mass is oscillating with an amplitude no more than a particular or predetermined threshold amplitude, thereby avoiding or minimizing any reduction in the energy conversion efficiency of the electromechanical generator when the electromechanical generator is operating in a particular or predetermined amplitude operating range which is no more than the particular or predetermined threshold amplitude.

The present invention accordingly provides, in a first aspect, an electromechanical generator for converting mechanical vibrational energy into electrical energy, the electromechanical generator comprising: a mass resiliently connected to a body by a biasing device and adapted to oscillate about an equilibrium point relative to the body with an oscillation amplitude, a transducer configured to convert oscillations of the mass about the equilibrium point relative to the body into electrical energy, and a resilient device disposed between the biasing device and one of the mass and the body, wherein the resilient device is configured to be deformed between the biasing device and the one of the mass and the body only when the oscillation amplitude exceeds a predetermined non-zero threshold amplitude.

Herein, by "non-zero" it is meant that the predetermined threshold amplitude is not zero amplitude. Accordingly, when the mass oscillates at the predetermined threshold amplitude, the mass is oscillating, vibrating or moving about the equilibrium point relative to the body.

The generator is configured such that the mass is permitted to oscillate about the equilibrium point relative to the body with an oscillation amplitude no more than the predetermined threshold amplitude without the resilient device being deformed, e.g. compressed, between the biasing device and the one of the mass and the body. As such, in such scenarios, the resilient device does not cause any power loss from the generator when the oscillation amplitude of the mass is no more than the particular or predetermined threshold amplitude. However, the generator is configured such that, when the oscillation amplitude exceeds the predetermined threshold amplitude, such as when it is subjected to a severe shock, the resilient device is then deformed, e.g. compressed, between the biasing device and the one of the mass and the body, to act as a limiter that limits the oscillation amplitude.

Accordingly, an electromechanical generator embodying the present invention has particular utility in environments where it may be subjected to occasional severe shocks.

Optionally, the resilient device is configured to contact the biasing device when the resilient device is deformed between the biasing device and the one of the mass and the body. Alternatively, the electromechanical generator comprises a hard or rigid device, such as a circlip, configured to isolate the resilient device from the biasing device when the resilient device is deformed between the biasing device and the one of the mass and the body.

The resilient device may be mounted on the one of the mass and the body. The resilient device may be spaced from the biasing device when the mass is at the equilibrium point. Preferably, the one of the mass and the body to which the resilient device is mounted comprises a hard surface or seat that the resilient device contacts. The hard surface or seat may be provided by a hard component, such as an annular or non-annular component, of the mass or body, respectively.

The resilient device may be mounted on the biasing device. The resilient device may be spaced from the one of the mass and the body when the mass is at the equilibrium point.

Preferably, the resilient device has a spring constant that is greater than a spring constant of the biasing device. However, the resilient device may have a spring constant that is less than or equal to a spring constant of the biasing device.

The resilient device may comprise one of a spring washer, a helical spring and an elastomeric device or moulding, such as an O-ring. The spring washer may be selected from the group consisting of: a Belleville washer, a curved disc spring, a wave washer, and a split washer. Preferably, the resilient device is a monolithic compliant device.

The electromechanical generator may comprise a spring device disposed between the biasing device and the one of the mass and the body, and configured to bias the resilient device against one of the biasing device and the one of the mass and the body. Preferably, the resilient device is retained against the biasing device, mass or body only by the spring device. That is, preferably the resilient device is not adhered or otherwise fixed to any of the biasing device, mass and body.

In use of the electromechanical generator, the mass and the resilient device are subjected to acceleration. The spring device should be stiff enough to withstand any inertial forces from the first resilient device. That is, when the resilient device is mounted on one of the mass and the biasing device, it is preferable, though not essential, to keep the resilient device in contact with the one of the mass and the biasing device at all times during oscillation of the mass. To achieve this, the spring device may be mounted in a compressed state between the resilient device and one of the mass and the biasing device on assembly of the generator (which implies a minimum spring rate of the spring device), so that the resilient device is biased against one of the biasing device and the mass when the mass is at the equilibrium point. However, the spring device should be sufficiently compliant to ensure that the resilient device remains in contact with the one of the mass and the biasing device when the resilient device is deformed during oscillation of the mass (which implies a maximum spring rate of the spring device). A spring constant of the spring device may be intermediate respective spring constants of the biasing device and the resilient device.

The spring device may comprise a spring washer, such as one of a Belleville washer, a curved disc spring, a wave washer, and a split washer. Preferably, the spring device is a monolithic compliant device.

Preferably, the mass is resiliently connected to the body by the biasing device and by a second biasing device, each of the biasing device and the second biasing device biasing the mass in a respective one of two opposed directions towards the equilibrium point. The mass may be resiliently connected to the body for linear vibrational motion along an axis. The biasing device and the second biasing device may be spaced from each other along the axis.

The resilient device may have a hole through which the axis passes. Preferably, the resilient device is rotationally symmetric about the axis.

Preferably, the electromechanical generator comprises a second resilient device disposed between the second biasing device and one of the mass and the body. When the resilient device is disposed between the biasing device and a selected one of the mass and the body, preferably the second resilient device is disposed between the second biasing device and the same, selected one of the mass and the body.

The second resilient device may be mounted on the one of the mass and the body. The second resilient device may be spaced from the second biasing device when the mass is at the equilibrium point. Preferably, the one of the mass and the body to which the second resilient device is mounted comprises a hard surface or seat that the second resilient device contacts. The hard surface or seat may be provided by a hard component, such as an annular or non-annular component, of the mass or body, respectively.

Preferably, the second resilient device comprises one of a spring washer, a helical spring and an elastomeric device or moulding, such as an O-ring. Preferably the second resilient device comprises a spring washer selected from the group consisting of: a Belleville washer, a curved disc spring, a wave washer, and a split washer. Preferably, the second resilient device is a monolithic compliant device.

Preferably, the resilient device comprises a first Belleville washer and the second resilient device comprises a second Belleville washer. The first and second Belleville washers may be disposed with their interior sides facing towards each other. Alternatively, the first and second Belleville washers may be disposed with their interior sides facing away from each other. Alternatively still, the first and second Belleville washers may be disposed with their respective interior sides facing in the same direction, i.e. not facing towards each other or away from each other.

The electromechanical generator may comprise a second spring device disposed between the second biasing device and the one of the mass and the body, and configured to bias the second resilient device against one of the second biasing device and the one of the mass and the body. Preferably, the second resilient device is retained against the second biasing device, mass or body only by the second spring device. That is, preferably the second resilient device is not adhered or otherwise fixed to any of the second biasing device, mass and body. The second spring device may have any of the properties of the spring device discussed above. In particular, a spring constant of the second spring device may be intermediate respective spring constants of the second biasing device and the second resilient device.

A second aspect of the present invention provides an electromechanical generator for converting mechanical vibrational energy into electrical energy, the electromechanical generator comprising: a mass resiliently connected to a body by a biasing device and adapted to oscillate about an equilibrium point relative to the body, a transducer configured to convert oscillations of the mass about the equilibrium point relative to the body into electrical energy, and a spring washer disposed between the mass and the body.

The spring washer may be selected from the group consisting of: a Belleville washer, a curved disc spring, a wave washer, and a split washer. Preferably, the spring washer is a monolithic compliant device.

Preferably, the mass is adapted to oscillate about the equilibrium point relative to the body with an oscillation amplitude, and the spring washer is configured to be deformed, e.g. compressed, between the mass and the body only when the oscillation amplitude exceeds a predetermined non-zero threshold amplitude.

Preferably, the spring washer is disposed between the biasing device and one of the mass and the body. Preferably, the mass is adapted to oscillate about the equilibrium point relative to the body with an oscillation amplitude, and the spring washer is configured to be deformed, e.g. compressed, between the biasing device and the one of the mass and the body only when the oscillation amplitude exceeds a predetermined non-zero threshold amplitude.

Preferably, the mass is resiliently connected to the body by the biasing device and by a second biasing device, each of the biasing device and the second biasing device biasing the mass in a respective one of two opposed directions towards the equilibrium point. Preferably, the spring washer is disposed between the biasing device and one of the mass and the body, and the electromechanical generator comprises a second spring washer disposed between the second biasing device and one of the mass and the body. When the spring washer is disposed between the biasing device and a selected one of the mass and the body, preferably the second spring washer is disposed between the second biasing device and the same, selected one of the mass and the body.

In the electromechanical generator of the first aspect of the present invention or of the second aspect of the present invention, preferably the biasing device comprises a cantilever beam, such as a curved cantilever beam. Preferably, the mass and the body are affixed to opposed ends of the cantilever beam.

In the electromechanical generator of the first aspect of the present invention or of the second aspect of the present invention, the body may comprise a housing surrounding the mass and the biasing device.

In the electromechanical generator of the first aspect of the present invention or of the second aspect of the present invention, the transducer preferably comprises a first apparatus comprised in the body and a second apparatus comprised in the mass, and preferably the second apparatus is electromagnetically coupled to the first apparatus. When the body comprises the housing, preferably the first apparatus is fixed relative to the housing or forms at least part of the housing.

Preferably, one of the first and second apparatuses comprises one of one or more magnets, one or more electrically conductive coils, and an element of magnetically permeable material, and the other of the first and second apparatuses comprises one of one or more electrically conductive coils, one or more magnets, and a combination of one or more magnets and one or more electrically conductive coils.

In the electromechanical generator of the first aspect of the present invention or of the second aspect of the present invention, the transducer may comprise a piezoelectric element disposed so that the oscillations of the mass relative to the body cause the piezoelectric element to be deformed, wherein the transducer is configured to convert the deformation of the piezoelectric element into electrical energy.

The electromechanical generator of the second aspect of the present invention may comprise any of the above-discussed optional and/or preferable features of the electromechanical generator of the first aspect of the present invention.

A third aspect of the present invention provides a vehicle comprising an unsprung mass, wherein an electromechanical generator according to the first aspect of the present invention and/or according to the second aspect of the present invention is comprised in, coupled to, or mounted on the unsprung mass. The electromechanical generator may be coupled to or mounted on the unsprung mass via a resilient coupling, such as an elastomeric coupling. The resilient coupling may be monolithic.

The resilient coupling may be adapted to transmit to the electromechanical generator a shock to which the unsprung mass is subjected, wherein the mass is resiliently connected to the body for linear vibrational motion along an axis, and wherein the shock subjects the unsprung mass to a change in velocity of between 0.5 and 5 meters per second in a direction along the axis. The shock may have a duration of between 1 and 2 milliseconds and a magnitude of between 75 g and 300 g (where 'g' is acceleration due to gravity, 9.81 m/s$^2$) in a direction along the axis. For example, the shock may have an acceleration of 300 g for 1 ms (which equals a change in velocity of 2.94 m/s), or an acceleration of 75 g for 2 ms (which equals a change in velocity of 1.47 m/s).

The electromechanical generator comprised in the vehicle of the third aspect of the present invention may comprise any of the above-discussed optional and/or preferable features of the electromechanical generator of the first aspect of the present invention, and/or any of the above-discussed optional and/or preferable features of the electromechanical generator of the second aspect of the present invention A fourth aspect of the present invention provides an assembly comprising an axle box for a vehicle and an electromechanical generator according to the first aspect of the present invention and/or according to the second aspect of the present invention comprised in, coupled to, or mounted on the axle box. The electromechanical generator may be coupled to or mounted on the axle box via a resilient coupling, such as an elastomeric coupling. The resilient coupling may be monolithic.

The resilient coupling may be adapted to transmit to the electromechanical generator a shock to which the axle box is subjected, wherein the mass is resiliently connected to the body for linear vibrational motion along an axis, and wherein the shock subjects the axle box to a change in velocity of between 0.5 and 5 meters per second in a direction along the axis. The shock may have a duration of between 1 and 2 milliseconds and a magnitude of between 75 g and 300 g in a direction along the axis. For example, the shock may have an acceleration of 300 g for 1 ms (which equals a change in velocity of 2.94 m/s), or an acceleration of 75 g for 2 ms (which equals a change in velocity of 1.47 m/s).

The electromechanical generator comprised in the assembly of the fourth aspect of the present invention may comprise any of the above-discussed optional and/or preferable features of the electromechanical generator of the first aspect of the present invention, and/or any of the above-discussed optional and/or preferable features of the electromechanical generator of the second aspect of the present invention A fifth aspect of the present invention provides a method of converting mechanical vibrational energy into electrical energy using an electromechanical generator, the method comprising the steps of: providing an electromechanical generator according to the first aspect of the present invention and/or according to the second aspect of the present invention, and vibrating the electromechanical generator thereby causing the mass to oscillate about the equilibrium point relative to the body thereby causing the transducer to convert oscillations of the mass about the equilibrium point relative to the body into electrical energy.

The electromechanical generator provided in the method of the fifth aspect of the present invention may comprise any of the above-discussed optional and/or preferable features of the electromechanical generator of the first aspect of the present invention, and/or any of the above-discussed optional and/or preferable features of the electromechanical generator of the second aspect of the present invention

BRIEF DESCRIPTION OF THE DRAWINGS

Embodiments of the present invention will now be described by way of example only with reference to the accompanying drawings, in which.

DETAILED DESCRIPTION OF THE PREFERRED EMBODIMENTS

The electromechanical generator of these embodiments of the present invention is a resonant generator known in the art as "velocity-damped", where all of the work done by the movement of the mass relative to the body is proportional to the instantaneous velocity of that movement. Inevitably, a portion of that work is absorbed overcoming unwanted mechanical or electrical losses, but the remainder of the work may be used to generate an electrical current via a suitable transduction mechanism, such as the electrical coil/magnetic assembly described below.

Figure 1:
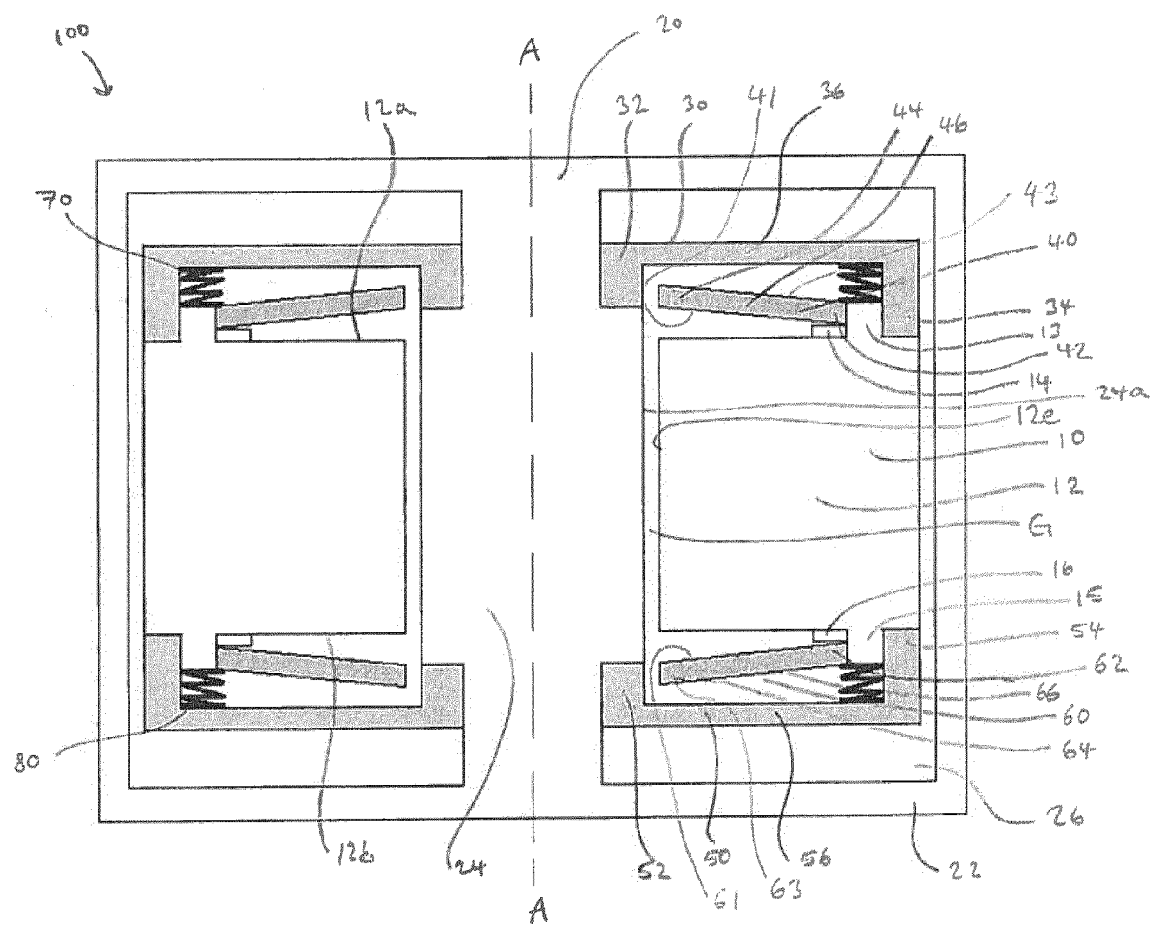
FIG. 1 is a schematic side sectional elevation of an electromechanical generator for converting mechanical vibrational energy into electrical energy in accordance with a first embodiment of the present invention.

FIG. 1 shows an electromechanical generator 100 for converting mechanical vibrational energy into electrical energy in accordance with a first embodiment of the present invention. The electromechanical generator 100 comprises an annular mass 10 resiliently connected to a body 20 and adapted to oscillate about an equilibrium point relative to the body 20 with an oscillation amplitude. The mass 10 is shown at the equilibrium point in FIG. 1. The mass 10 is movable relative to the body 20 along an axis A-A by input mechanical vibration having a component in that linear direction. In this embodiment, the mass 10 is rotationally symmetric, or at least substantially rotationally symmetric, about the axis A-A and has a central opening through the centre of which the axis A-A passes. The mass 10 is radially spaced from a central portion 24 of the body 20 by a gap G.

The mass 10 is connected to the body 20 by a pair of biasing devices 30, 50, each of which is a flat spring of a circular annular shape and comprising a plurality of curved cantilever beams. The biasing devices 30, 50 are spaced from each other along the axis A-A with the mass 10 disposed therebetween, and each of the biasing devices 30, 50 biases the mass 10 in a respective one of two opposed directions parallel to the axis A-A towards the equilibrium point.

The mass 10 has a first annular protrusion 13 that extends axially from a first axial end of the main portion 12 of the mass 10, and a second annular protrusion 15 that extends axially from a second axial end of the main portion 12 of the mass 10, which second axial end is opposite the first axial end. Each of the first and second annular protrusions 13, 15 is circular with the axis A-A passing through the centre of the circle. A first biasing device 30 of the pair has a radially inner end 32 connected or affixed to the central portion 24 of the body 20 and a radially outer end 34 connected or affixed to the mass 10 radially outwards of the first annular protrusion 13. The radially inner and outer ends 32, 34 of the first biasing device 30 are joined by a central portion 36 of the first biasing device 30 that has a dimension parallel to the axis A-A smaller than the respective dimensions parallel to the axis A-A of each of the radially inner and outer ends 32, 34. Similarly, a second biasing device 50 of the pair has a radially inner end 52 connected or affixed to the central portion 24 of the body 20 and an opposite, radially outer end 54 connected or affixed to the mass 10 radially outwards of the second annular protrusion 15. The radially inner and outer ends 52, 54 of the second biasing device 50 are joined by a central portion 56 of the second biasing device 50 that has a dimension parallel to the axis A-A smaller than the respective dimensions parallel to the axis A-A of each of the radially inner and outer ends 52, 54.

Figure 2:
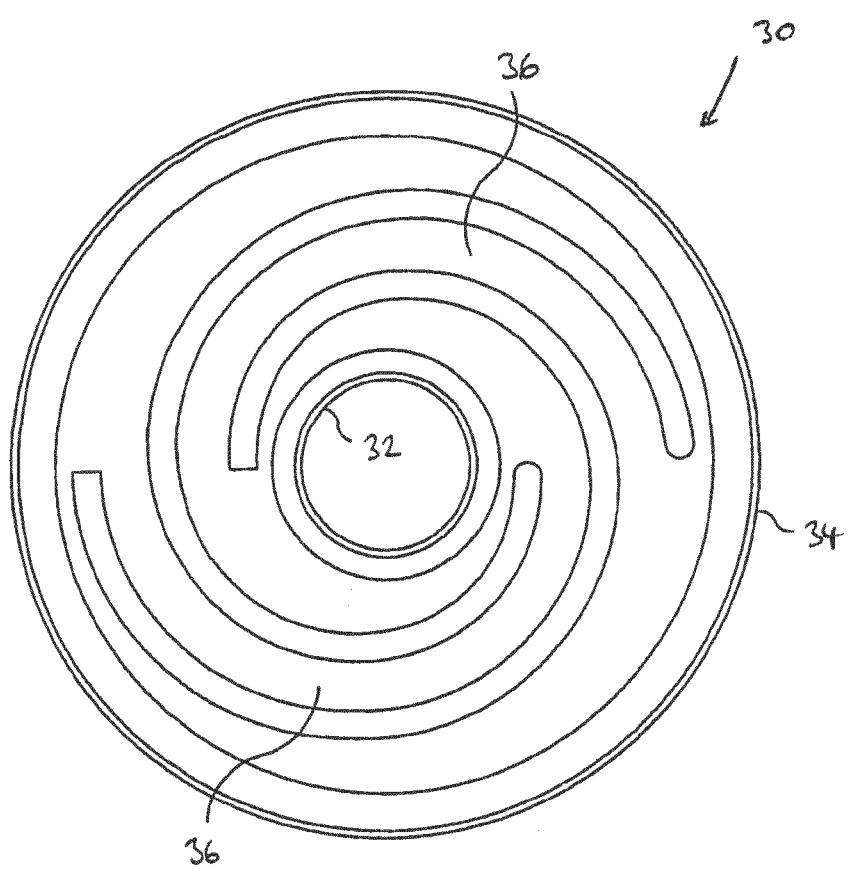
FIG. 2 is a schematic plan view of a first biasing device of the electromechanical generator of FIG. 1.

FIG. 2 shows an example of the form of the first biasing device 30. The example first biasing device 30 is a flat spring, preferably made of a metal such as spring steel. As shown in FIG. 2, the biasing device 30 has plural spiral arms 36 extending between the annular radially inner end 32 and the annular radially outer end 34. The inner end 32 defines an inner circumferential side of the biasing device 30, and the outer end 34 defines an outer circumferential side of the biasing device 30. Each of the spiral arms 36 constitutes a central portion 36 of one cantilever beam of the first biasing device 30. As can be seen in FIG. 2, the first biasing device 30 comprises two spiral arms 36 and, thus, two curved cantilever beams. In alternative embodiments, the first biasing device 30 may have only one curved or straight cantilever beam, or more than two curved or straight cantilever beams. In any one embodiment, the second biasing device 50 preferably takes the same form as the first biasing device 30.

Each of the respective inner ends 32, 52 of the biasing devices 30, 50 defines and surrounds an opening through which the axis A-A passes. That is, each of the biasing devices 30, 50 can be considered to have a central opening, through a centre of which the axis A-A passes. Accordingly, each of the biasing devices 30, 50 is concentric with the mass 10. The cylindrical central portion 24 of the body 20 extends through the respective central openings of the biasing devices 30, 50, with a central longitudinal axis of the central portion 24 of the body 20 being coincident with the axis A-A. The body 20 further comprises a housing 22 extending from the central portion 24 and surrounding and encasing the mass 10 and the biasing devices 30, 50. The housing 22 may be hermetically sealed so that a volume 26 defined by the housing 22, within which volume 26 the mass 10 and the biasing devices 30, 50 are disposed, is isolated from an exterior of the housing 22 and, thus, from an exterior of the electromechanical generator 100.

The electromechanical generator 100 further comprises a transducer configured to convert oscillations of the mass 10, i.e. mechanical vibrational movement of the mass 10, about the equilibrium point relative to the body 20 into electrical energy. The transducer is not expressly shown in FIG. 1, but the skilled person would readily be able to arrange a suitable transducer in the illustrated electromechanical generator 100 to achieve this effect. The transducer has wires (not shown) extending therefrom for connecting to external circuitry (not shown). Relative linear vibrational movement or oscillation between the mass 10 and the body 20 along the axis A-A causes an electrical current to be generated by the transducer which is outputted via the wires.

In embodiments of the present invention, preferably the transducer comprises a first apparatus comprised in the body 20 and a second apparatus comprised in the mass 10, wherein the second apparatus is electromagnetically coupled to the first apparatus. More preferably, the first apparatus is fixed relative to the housing 22 of the body 20. Alternatively, the first apparatus may form at least part of the housing 22. When the transducer comprises electromagnetically coupled first and second apparatuses, preferably one of the first and second apparatuses comprises one of one or more magnets, one or more electrically conductive coils, and an element of magnetically permeable material, and the other of the first and second apparatuses comprises one of one or more electrically conductive coils, one or more magnets, and a combination of one or more magnets and one or more electrically conductive coils.

In this embodiment, the transducer (not shown) comprises a first apparatus comprised in the body 20, which first apparatus comprises a coil fixed to the central portion 24 of the body 20, and a second apparatus comprised in the mass 10, which second apparatus comprises two axially-opposed cylindrical magnets arranged to generate flux between the magnets and the rest of the mass 10. The coil is radially disposed between the magnets and the rest of the mass, so that the flux cuts the coil. The first apparatus is electromagnetically coupled to the second apparatus.

In a variation to this embodiment, the transducer comprises a first apparatus comprised in the body 20, which first apparatus comprises a cylinder of magnetically permeable material at a radially outer side 24a of the central portion 24 of the body 20, and two coils with an annular radial magnet therebetween fixed around the cylinder, and a second apparatus comprised in the mass 10, which second apparatus comprises an element of magnetically permeable material. Again, the first apparatus is electromagnetically coupled to the second apparatus.

However, as mentioned above, the skilled person would readily be able to devise and provide suitable alternative transducers that convert oscillations of the mass 10, i.e. mechanical vibrational movement of the mass 10, about the equilibrium point relative to the body 20 into electrical energy.

A first surface 12a, at a first axial end of the main portion 12, extending radially inwards from the first annular protrusion 13 and extending radially outwards from the radially inner side 12e of the main portion 12 has an annular shape and lies in a plane perpendicular to the axis A-A. The mass 10 comprises a first annular shim washer 14 that is in contact with the first surface 12a and is disposed radially inwards of the first annular protrusion 13, whereby the first shim washer 14 is radially retained relative to the main portion 12 and concentrically aligned with the main portion 12. Similarly, a second surface 12b, at an opposite second axial end of the main portion 12, extending radially inwards from the second annular protrusion 15 and extending radially outwards from the radially inner side 12e of the main portion 12 has an annular shape and lies in a plane perpendicular to the axis A-A. The mass 10 comprises a second annular shim washer 16 that is in contact with the second surface 12b and is disposed radially inwards of the second annular protrusion 15, whereby the second shim washer 16 is radially retained relative to the main portion 12 and concentrically aligned with the main portion 12.

The electromechanical generator 100 further comprises a pair of resilient devices 40, 60, each of which is disposed between the body 20 and the mass 10. More specifically, each of the pair of resilient devices 40, 60 is disposed between one of the biasing devices 30, 50 and the mass 10. Each of the resilient devices 40, 60 has a spring constant that is greater than the spring constants of the biasing devices 30, 50. Each of the first and second resilient devices 40, 60 of the pair is a monolithic compliant device in the form of a spring washer with a round frusto-conical shape, i.e. a Belleville washer. Each of the first and second resilient devices 40, 60 has continuous rotational symmetry about the axis A-A and a central opening with a centre through which the axis A-A passes. Accordingly, each of the first and second resilient devices 40, 60 is concentric with the mass 10 and concentric with the first and second biasing devices 30, 50.

The first resilient device 40 has an inner portion 44 surrounding and defining the central opening of the first resilient device 40 at a first axial end of the first resilient device 40, and an outer portion 42 defining an outer circumferential side of the first resilient device 40 at a second axial end of the first resilient device 40, opposite to the first axial end. The inner and outer portions 44, 42 of the first resilient device 40 are joined by a middle portion 46 of the first resilient device 40.

The first resilient device 40 is disposed radially inwards of the first annular protrusion 13, whereby the first resilient device 40 is radially retained relative to the mass 10 and is concentrically aligned with the mass 10. Moreover, a first, interior side 41 of the first resilient device 40 faces the mass 10 and, at the outer portion 42, is in contact with the first shim washer 14 but is movable relative to the first shim washer 14, as discussed below. Accordingly, while the first resilient device 40 is mounted on the mass 10, it is not fixed to, or fixed relative to, the mass 10. The interior side 41 of the first resilient device 40 at the inner portion 44 and at the middle portion 46 is spaced from the mass 10. Moreover, a second, exterior side 43, opposite to the interior side 41, of the first resilient device 40 at all of the outer portion 42, inner portion 44 and middle portion 46 of the first resilient device 40 faces, and is spaced from, the first biasing device 30, at least when the mass is at the equilibrium point as shown in FIG. 1. A first spring device 70 comprising a wave washer is compressed between the first biasing device 30 and the first annular protrusion 13 of the mass 10. A first end of the first spring device 70 is in contact with the first biasing device 30 and a second, opposite end of the first spring device 70 is in contact with both the annular protrusion 13 and the exterior side 43 of the first resilient device 40, whereby the first spring device 70 biases the outer portion 42 of the first resilient device 40 against the mass 10. A spring constant of the first spring device 70 may be intermediate respective spring constants of the first biasing device 30 and the first resilient device 40.

The second resilient device 60 has an inner portion 64 surrounding and defining the central opening of the second resilient device 60 at a first axial end of the second resilient device 60, and an outer portion 62 defining an outer circumferential side of the second resilient device 60 at a second axial end of the second resilient device 60, opposite to the first axial end. The respective interior sides 41, 61 of the first and second resilient devices 40, 60 face each other through the mass 10. The inner and outer portions 64, 62 of the second resilient device 60 are joined by a middle portion 66 of the second resilient device 60.

The second resilient device 60 is disposed radially inwards of the second annular protrusion 15, whereby the second resilient device 60 is radially retained relative to the mass 10 and is concentrically aligned with the mass 10. Moreover, a first, interior side 61 of the second resilient device 60 faces the mass 10 and, at the outer portion 62, is in contact with the second shim washer 16 but is movable relative to the second shim washer 16, as discussed below. Accordingly, while the second resilient device 60 is mounted on the mass 10, it is not fixed to, or fixed relative to, the mass 10. The interior side 61 of the second resilient device 60 at the inner portion 64 and at the middle portion 66 is spaced from the mass 10. Moreover, a second, exterior side 63, opposite to the interior side 61, of the second resilient device 60 at all of the outer portion 62, inner portion 64 and middle portion 66 of the second resilient device 60 faces, and is spaced from, the second biasing device 50, at least when the mass 10 is at the equilibrium point as shown in FIG. 1. A second spring device 80 comprising a wave washer is compressed between the second biasing device 50 and the second annular protrusion 15 of the mass 10. A first end of the second spring device 80 is in contact with the second biasing device 50 and a second, opposite end of the second spring device 80 is in contact with both the annular protrusion 15 and the exterior side 63 of the second resilient device 60, whereby the second spring device 80 biases the outer portion 62 of the second resilient device 60 against the mass 10. A spring constant of the second spring device 80 may be intermediate respective spring constants of the second biasing device 50 and the second resilient device 60.

When the electromechanical generator 100 is subjected to an input mechanical vibration having a component in a direction parallel to the axis A-A, the mass 10 is caused to oscillate about the equilibrium point relative to the body 20 thereby causing the transducer (not shown) to convert oscillations of the mass 10 about the equilibrium point relative to the body 20 into electrical energy.

The first and second resilient devices 40, 60 are shaped and positioned in dependence on the spacing of the biasing devices 30, 50 relative to the mass 10 and/or optionally in dependence on the limit of proportionality of the material from which the biasing devices 30, 50 are made, so that the mass 10 is permitted to oscillate about the equilibrium point relative to the body 20 with an oscillation amplitude no more than the predetermined threshold amplitude without the first and second resilient devices 40, 60 contacting the first and second biasing devices 30, 50. That is, the first and second resilient devices 40, 60 are configured not to be compressed between the mass 10 and the body 20 (more specifically between the biasing devices 30, 50 and the mass 10) when the mass 10 oscillates with an amplitude no more than the predetermined threshold amplitude. Accordingly, the first and second resilient device 40, 60 do not cause any power loss from the electromechanical generator 100 when the oscillation amplitude of the mass 10 is no more than the predetermined threshold amplitude.

However, when (and only when) the oscillation amplitude exceeds the predetermined threshold amplitude, the first and second resilient devices 40, 60 periodically intercept, i.e. contact, the first and second biasing devices 30, 50 and thus periodically become compressed between the mass 10 and the body 20 (more specifically between the first and second biasing devices 30, 50 and the mass 10). That is, the first and second resilient devices 40, 60 become compressed by the first and second biasing devices 30, 50 and the mass 10 as a result of the first and second biasing devices 30, 50 becoming too close to the mass 10 during oscillation of the mass 10, for the mass 10 oscillates relative to the central portions 36, 56 of the first and second biasing devices 30, 50 when oscillating relative to the body 20. Accordingly, the first and second resilient devices 40, 60 act as compliant limiters or limit stops that limit the amplitude of oscillation of the mass 10.

This deformation of the first and second resilient devices 40, 60 causes their respective outer portions 42, 62 to slide along the first and second shim washers 14, 16 of the mass 10. For this reason, it is beneficial to use a hard material for the shim washers 14, 16, and it is beneficial to make the first and second resilient devices 40, 60 from a material that is compatible with that of the shim washers 14, 16. For example, the first and second resilient devices 40, 60 may be made of phosphor-bronze when the shim washers 14, 16 are made from steel. However, in a variation to the first embodiment, the shim washers 14, 16 may be omitted so that the respective outer portions 42, 62 of the first and second resilient devices 40, 60 directly contact the mass 10.

Figure 3:
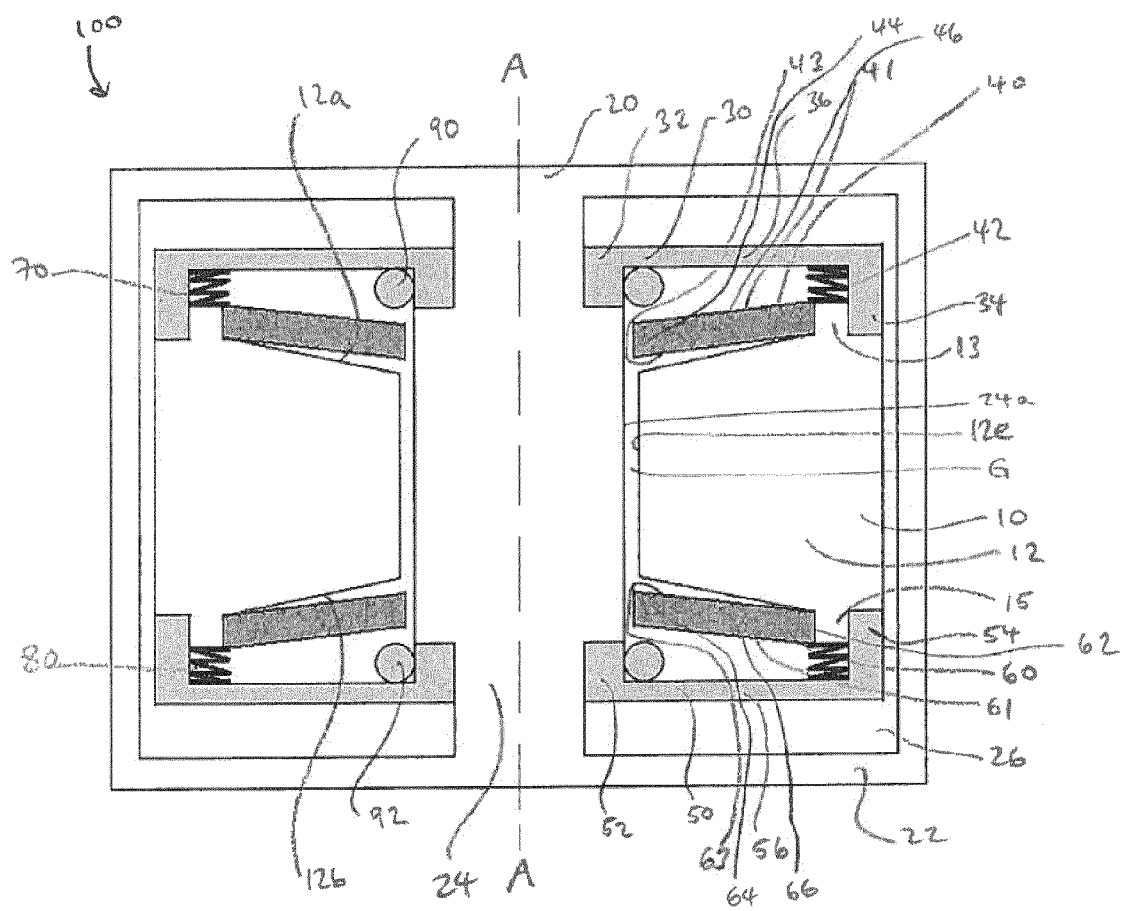
FIG. 3 is a schematic side sectional elevation of an electromechanical generator for converting mechanical vibrational energy into electrical energy in accordance with a second embodiment of the present invention.

FIG. 3 shows an electromechanical generator 100 for converting mechanical vibrational energy into electrical energy in accordance with a second embodiment of the present invention. Like components of the first and second embodiments are identified with like reference numerals. Moreover, for conciseness, discussion of the second embodiment will be limited to features which differ between the first and second embodiments. Accordingly, it should be assumed that features of the second embodiment not referred to in detail, or at all, may be the same as the corresponding features of the first embodiment. It is to be understood that the above-described possible modifications to the electromechanical generator of first embodiment are equally applicable to the electromechanical generator of the second embodiment.

In the second embodiment, the body 20 and the biasing devices 30, 50 are as for the first embodiment. The mass 10 is substantially the same as the mass 10 of the first embodiment, except that the shim washers 14, 16 are omitted, and the first and second surfaces 12a, 12b of the main portion 12 do not lie in respective planes perpendicular to the axis A-A. Instead, the first and second surfaces 12a, 12b are spaced furthest apart from each other at their respective ends adjacent the first and second annular protrusions 13, 15, and are spaced closest to each other at their respective ends adjacent the radially inner side 12e of the main portion 12.

As in the first embodiment, in the second embodiment each of the pair of resilient devices 40, 60 is disposed between one of the biasing devices 30, 50 and the mass 10, and each of the first and second resilient devices 40, 60 is a monolithic compliant device in the form of a spring washer with a round frusto-conical shape, i.e. a Belleville washer. Each of the first and second resilient devices 40, 60 has continuous rotational symmetry about the axis A-A and a central opening with a centre through which the axis A-A passes. Accordingly, each of the first and second resilient devices 40, 60 is concentric with the mass 10 and concentric with the first and second biasing devices 30, 50.

However, in contrast to the first embodiment, in the second embodiment the first and second resilient devices 40, 60 are inverted so that their respective exterior sides 43, 63 face each other through the mass 10 and so that their respective interior sides 41, 61 face away from each other. The exterior sides 43, 63 of the first and second resilient devices 40, 60 face the mass 10 and, at the respective outer portions 42, 62, are in contact respectively with the first and second surfaces 12a, 12b. The exterior sides 43, 63 at the inner portions 44, 64 and at the middle portions 46, 66 are spaced from the mass 10. The interior sides 41, 61 of the first and second resilient devices 40, 60 at all of the outer portions 42, 62, inner portions 44, 64 and middle portions 46, 66 of the first and second resilient devices 40, 60 face, and are spaced from, the first and second biasing devices 30, 50, respectively. The respective first ends of the first and second spring devices 70, 80 are in contact with the first and second biasing devices 30, 50 respectively, and the respective second ends of the first and second spring devices 70, 80 are in contact with the respective annular protrusions 13, 15 and the respective interior sides 41, 61 of the first and second resilient devices 40, 60, whereby the first and second spring devices 70, 80 bias the outer portions 42, 62 of the first and second resilient devices 40, 60 against the mass 10.

In the second embodiment, a pair of hard devices 90, 92 (in this embodiment, each in the form of hard circlip, although hard devices of other forms may instead be used in variations to this embodiment) are attached to the first and second biasing devices 30, 50 radially inwards of, and abutting, their respective radially inner ends 32, 52. The hard devices 90, 92 are shaped and positioned, relative to the first and second biasing devices 30, 50 and the first and second resilient devices 40, 60, so as to be configured to isolate the first and second resilient devices 40, 60 from the respective first and second biasing devices 30, 50 when the first and second resilient devices 40, 60 are deformed between the first and second biasing devices 30, 50 and the mass 10 during oscillation of the mass 10 about the equilibrium point with an amplitude in excess of the predetermined threshold amplitude. Such an arrangement better preserves the first and second biasing devices 30, 50 during periods of oscillation of the mass 10 with an amplitude in excess of the predetermined threshold amplitude.

In the second embodiment, the mass 10 is permitted to oscillate about the equilibrium point relative to the body 20 with an oscillation amplitude no more than the predetermined threshold amplitude without the first and second resilient devices 40, 60 contacting the first and second hard devices 90, 92. However, when (and only when) the oscillation amplitude exceeds the predetermined threshold amplitude, the first and second resilient devices 40, 60 periodically intercept, i.e. contact, the hard devices 90, 92 (but do not contact the first and second biasing devices 30, 50), and thus periodically become compressed between the mass 10 and the body 20 (more specifically between the first and second biasing devices 30, 50 and the mass 10). That is, as for the first embodiment, the first and second resilient devices 40, 60 become compressed as a result of the first and second biasing devices 30, 50 becoming too close to the mass 10 during oscillation of the mass 10. Accordingly, the first and second resilient devices 40, 60 still act as compliant limiters or limit stops that limit the amplitude of oscillation of the mass 10.

Figure 4:
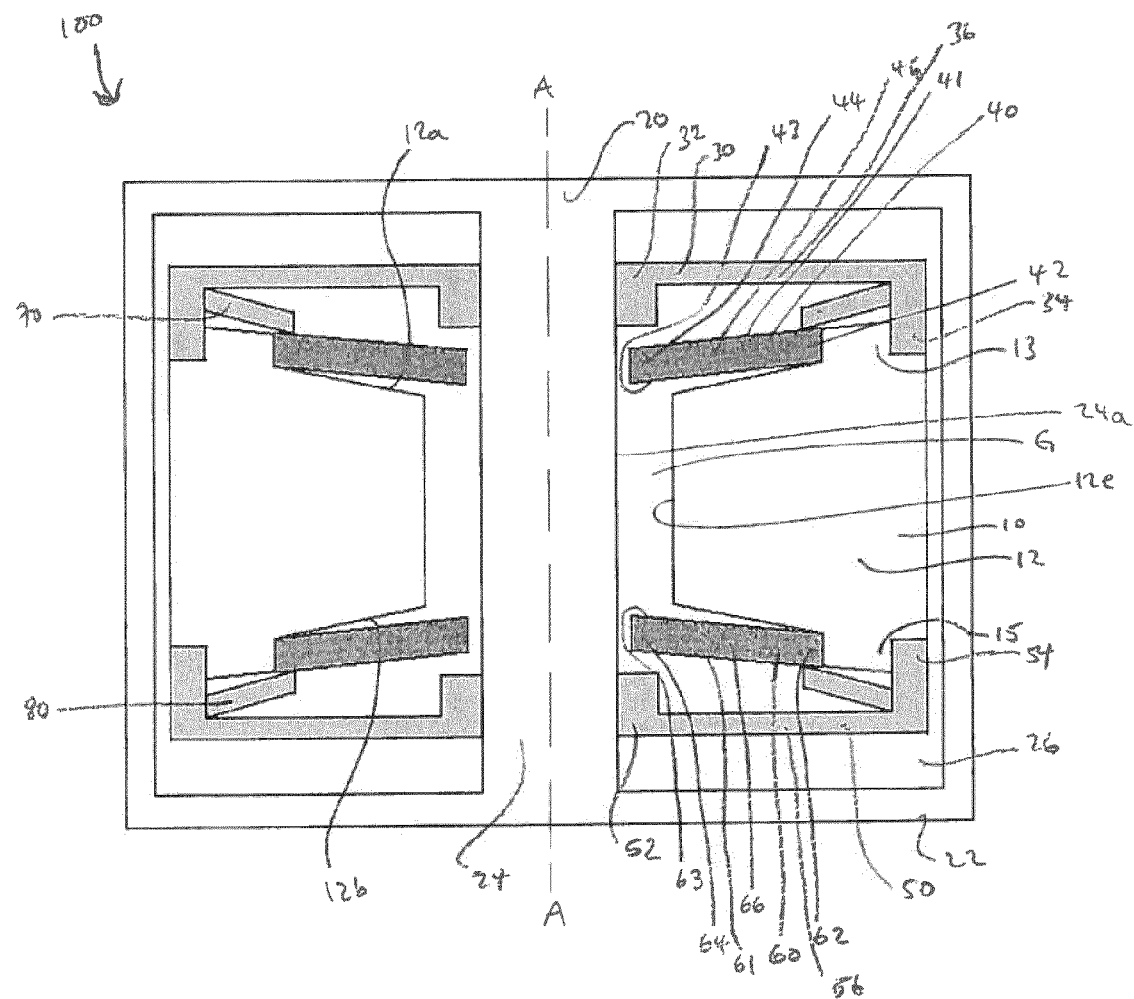
FIG. 4 is a schematic side sectional elevation of an electromechanical generator for converting mechanical vibrational energy into electrical energy in accordance with a third embodiment of the present invention.

FIG. 4 shows an electromechanical generator 100 for converting mechanical vibrational energy into electrical energy in accordance with a third embodiment of the present invention. Like components of the first, second and third embodiments are identified with like reference numerals. Moreover, for conciseness, discussion of the third embodiment will be limited to features which differ between the second and third embodiments. Accordingly, it should be assumed that features of the third embodiment not referred to in detail, or at all, may be the same as the corresponding features of the first or second embodiment. It is to be understood that the above-described possible modifications to the electromechanical generator of first and second embodiments are equally applicable to the electromechanical generator of the third embodiment.

In the third embodiment, the body 20 and the biasing devices 30, 50 are as for the second embodiment. The mass 10 is substantially the same as the mass 10 of the second embodiment, except that the first and second annular protrusions 13, 15 have surfaces distal from the respective first and second surfaces 12a, 12b that do not lie in a plane orthogonal to the axis A-A. Instead, the distal surfaces are spaced furthest apart from each other at their radially-outermost ends, and are spaced closest to each other at their radially-innermost ends.

In the third embodiment, the first and second spring devices 70, 80 comprise respective conical spring washers 70, 80. Nevertheless, the conical spring washers 70, 80 apply respective preloads to the first and second resilient devices 40, 60 in much the same way as the first and second spring devices 70, 80 do in the first and second embodiments.

As for the second embodiment, each of the first and second resilient devices 40, 60 is disposed between one of the biasing devices 30, 50 and the mass 10, and each of the first and second resilient devices 40, 60 is a monolithic compliant device in the form of a spring washer with a round frusto-conical shape, i.e. a Belleville washer. Each of the first and second resilient devices 40, 60 has continuous rotational symmetry about the axis A-A and a central opening with a centre through which the axis A-A passes. Accordingly, each of the first and second resilient devices 40, 60 is concentric with the mass 10 and concentric with the first and second biasing devices 30, 50. Moreover, as for the second embodiment, the first and second resilient devices 40, 60 are inverted so that their respective exterior sides 43, 63 face each other through the mass 10 and so that their respective interior sides 41, 61 face away from each other.

In the third embodiment, the hard devices 90, 92 are omitted. The mass 10 is permitted to oscillate about the equilibrium point relative to the body 20 with an oscillation amplitude no more than the predetermined threshold amplitude without the first and second resilient devices 40, 60 contacting the first and second biasing devices 30, 50. However, as in the first embodiment, when (and only when) the oscillation amplitude exceeds the predetermined threshold amplitude, the first and second resilient devices 40, 60 periodically intercept, i.e. contact, the first and second biasing devices 30, 50, and thus periodically become compressed between the mass 10 and the body 20 (more specifically between the first and second biasing devices 30, 50 and the mass 10). That is, as for the first embodiment, the first and second resilient devices 40, 60 become compressed as a result of the first and second biasing devices 30, 50 becoming too close to the mass 10 during oscillation of the mass 10. Accordingly, the first and second resilient devices 40, 60 still act as compliant limiters or limit stops that limit the amplitude of oscillation of the mass 10.

Figure 5:
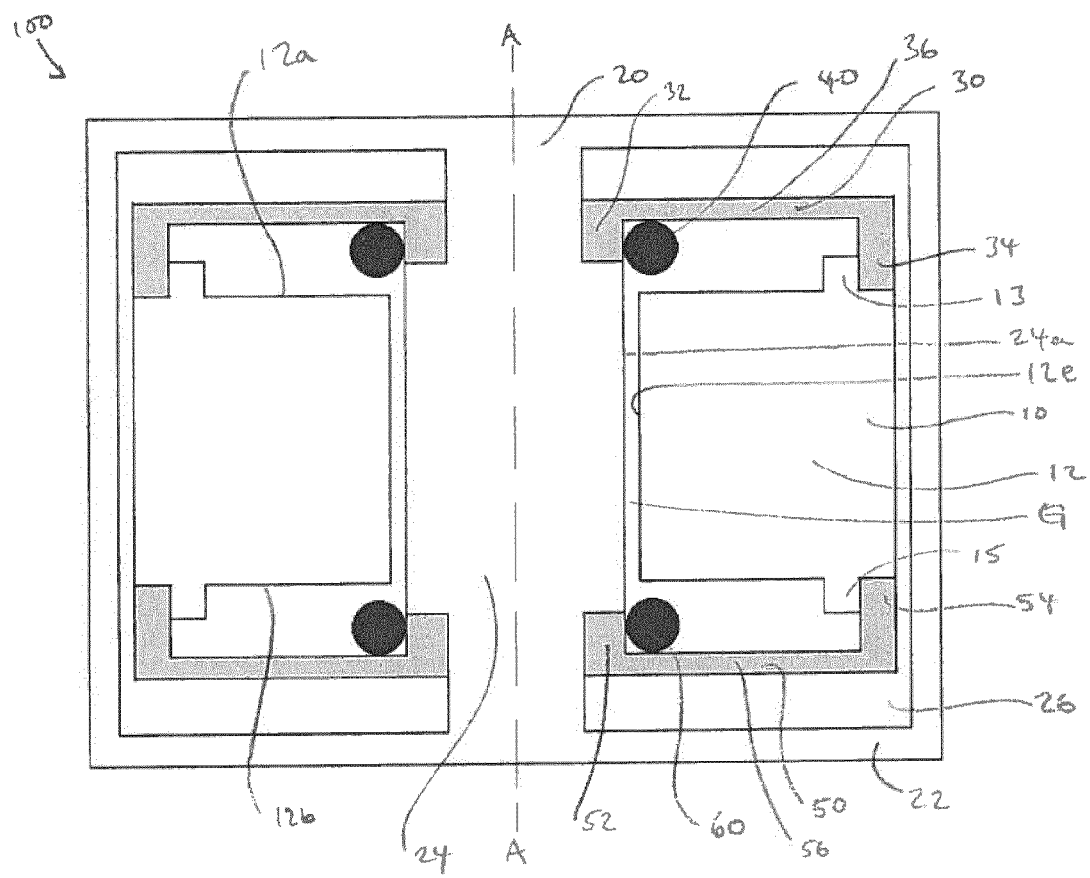
FIG. 5 is a schematic side sectional elevation of an electromechanical generator for converting mechanical vibrational energy into electrical energy in accordance with a fourth embodiment of the present invention.

FIG. 5 shows an electromechanical generator 100 for converting mechanical vibrational energy into electrical energy in accordance with a fourth embodiment of the present invention. Like components of the first and fourth embodiments are identified with like reference numerals.

Moreover, for conciseness, discussion of the fourth embodiment will be limited to features which differ between the first and fourth embodiments. Accordingly, it should be assumed that features of the fourth embodiment not referred to in detail, or at all, may be the same as the corresponding features of the first embodiment. It is to be understood that the above-described possible modifications to the electromechanical generator of first embodiment are equally applicable to the electromechanical generator of the fourth embodiment.

In the fourth embodiment, the body 20 and the biasing devices 30, 50 are as for the first embodiment. The mass 10 is substantially the same as the mass 10 of the first embodiment, except that the shim washers 14, 16 are omitted. Also omitted in the fourth embodiment are the first and second spring devices 70, 80.

Moreover, the first and second resilient devices 40, 60 of the fourth embodiment are of a different form to the first and second resilient devices 40, 60 of the first embodiment. In the fourth embodiment, the first and second resilient devices 40, 60 comprise respective resilient O-rings mounted on the first and second biasing devices 30, 50 radially inwards of, and abutting, their respective radially inner ends 32, 52. The O-rings are spaced from the mass 10 when the mass 10 is at the equilibrium point, as shown in FIG. 5. In variations to this embodiment, each O-ring may be replaced or supplemented with a different elastomeric device.

In the fourth embodiment, the mass 10 is permitted to oscillate about the equilibrium point relative to the body 20 with an oscillation amplitude no more than the predetermined threshold amplitude without the first and second resilient devices 40, 60 contacting the mass 10. However, when (and only when) the oscillation amplitude exceeds the predetermined threshold amplitude, the first and second resilient devices 40, 60 periodically intercept, i.e. contact, the mass 10, and thus periodically become compressed between the mass 10 and the body 20 (more specifically between the first and second biasing devices 30, 50 and the mass 10). That is, as for the first embodiment, the first and second resilient devices 40, 60 become compressed as a result of the first and second biasing devices 30, 50 becoming too close to the mass 10 during oscillation of the mass 10. Accordingly, the first and second resilient devices 40, 60 comprising respective O-rings still act as compliant limiters or limit stops that limit the amplitude of oscillation of the mass 10.

Theoretically, in devices outside the scope of the present invention, rigid (e.g. metal) limit stops could be provided to limit the oscillation amplitude of the mass 10, in an attempt to preserve the biasing devices 30, 50 and the mass 10 and/or the body 20. However, electromechanical generators embodying the present invention may be subjected to severe repeated shock, sufficient to erode rigid limit stops through repeated impacts. Accordingly, in accordance with embodiments of the present invention, instead of rigid limit stops, resilient or compliant devices 40, 60 are disposed specifically in space already existent between the biasing devices 30, 50 and one of the mass 10 and the body 20, in order not only to absorb some of the kinetic energy of the oscillating mass 10, but also to do so by way of a very compact structure.

In the above-described electromechanical generators embodying the present invention, the resilient devices 40, 60 may be configured such that the biasing devices 30, 50 still impact the mass 10 and/or the body 20 to a small degree, when the resilient devices 40, 60 are deformed between the biasing devices 30, 50 and the mass 10 and/or the body 20. However, preferably, the resilient devices 40, 60 are configured (i.e. are dimensioned and have a selected spring rate) to avoid such impacts occurring.

Any of the above electromechanical generators embodying the present invention may be comprised in, coupled to, or mounted on an unsprung mass of a vehicle, or an axle box for a vehicle, preferably via a resilient coupling, such as an elastomeric coupling, that may be monolithic.

Other modifications and embodiments of the present invention will be apparent to those skilled in the art.

For example, in each of the above-described embodiments, the first and second resilient devices 40, 60 are respectively disposed between the mass 10 and the first and second biasing devices 30, 50. In variations to these embodiments, first and second resilient devices 40, 60 are alternatively, or additionally, respectively disposed between the body 20 and the first and second biasing devices 30, 50. In such variations, when (and only when) the oscillation amplitude of the mass 10 exceeds the predetermined threshold amplitude, the first and second resilient devices 40, 60 periodically become compressed between the mass 10 and the body 20 (more specifically between the first and second biasing devices 30, 50 and the body 20). That is, the first and second resilient devices 40, 60 become compressed as a result of the first and second biasing devices 30, 50 becoming too close to the body 20 during oscillation of the mass 10, for the first and second biasing devices 30, 50 move relative to the body 20 as a result of oscillation of the mass 10 relative to the body 20. Accordingly, in such variations, the first and second resilient devices 40, 60 still act as compliant limiters or limit stops that limit the amplitude of oscillation of the mass 10.

Moreover, in other variations to the above-described embodiments, the first and second annular shim washers 14, 16 may be replaced by other respective annular or non-annular components of the mass 10 that provide a hard seat for the first and second resilient devices 40, 60. For example, respective retaining rings may be employed.

Moreover, in other variations to the above-described embodiments, the first and second resilient devices 40, 60 may comprise respective helical springs, volumes of resilient material, elastomeric devices or mouldings, or other resilient elements.

Furthermore, in further variations to the above-described embodiments, the transducer may comprise a piezoelectric element that is provided instead of, or as well as, the electromagnetically coupled first and second apparatuses. The piezoelectric element would be disposed so that the oscillations of the mass relative to the body cause the piezoelectric element to be deformed, and the transducer would be configured to convert the deformation of the piezoelectric element into electrical energy.

The invention claimed is:

1. An electromechanical generator for converting mechanical vibrational energy into electrical energy, the electromechanical generator comprising: a mass resiliently connected to a body by a biasing device and adapted to oscillate about an equilibrium point relative to the body with an oscillation amplitude, wherein the electromechanical generator is configured to convert oscillations of the mass about the equilibrium point relative to the body into electrical energy, and a resilient device disposed between the biasing device and one of the mass and the body, wherein the resilient device is configured to be deformed between the biasing device and the one of the mass and the body only when the oscillation amplitude exceeds a predetermined non-zero threshold amplitude.

2. An electromechanical generator according to claim 1, wherein the resilient device is configured to contact the biasing device when the resilient device is deformed between the biasing device and the one of the mass and the body.

3. An electromechanical generator according to claim 1, comprising a hard or rigid device configured to isolate the resilient device from the biasing device when the resilient device is deformed between the biasing device and the one of the mass and the body.

4. An electromechanical generator according to claim 1, wherein the resilient device is spaced from the biasing device when the mass is at the equilibrium point.

5. An electromechanical generator according to claim 1, wherein the resilient device is mounted on the biasing device, wherein the resilient device is spaced from the one of the mass and the body when the mass is at the equilibrium point.

6. An electromechanical generator according to claim 1, wherein the resilient device has a spring constant that is greater than a spring constant of the biasing device.

7. An electromechanical generator according to claim 1, wherein the resilient device comprises one of a spring washer, a helical spring and an elastomeric device or moulding.

8. An electromechanical generator according to claim 7, wherein the spring washer is selected from the group consisting of: a Belleville washer, a curved disc spring, a wave washer, and a split washer.

9. An electromechanical generator according to claim 1, comprising a spring device disposed between the biasing device and the one of the mass and the body, and configured to bias the resilient device against one of the biasing device and the one of the mass and the body.

10. An electromechanical generator according to claim 9, wherein the spring device comprises a spring washer.

11. An electromechanical generator according to claim 1, wherein the mass is resiliently connected to the body by the biasing device and by a second biasing device, each of the biasing device and the second biasing device biasing the mass in a respective one of two opposed directions towards the equilibrium point.

12. An electromechanical generator according to claim 11, wherein the mass is resiliently connected to the body for linear vibrational motion along an axis, and the biasing device and the second biasing device are spaced from each other along the axis.

13. An electromechanical generator according to claim 11, wherein the electromechanical generator comprises a second resilient device disposed between the second biasing device and one of the mass and the body.

14. An electromechanical generator according to claim 13, wherein the resilient device comprises a first Belleville washer and the second resilient device comprises a second Belleville washer, wherein the first and second Belleville washers are disposed with their interior sides facing towards each other, facing away from each other, or facing in the same direction.

15. An electromechanical generator according to claim 1, wherein the biasing device comprises a cantilever beam.

16. An electromechanical generator according to claim 1, wherein the electromechanical generator is comprised in, coupled to, or mounted on an unsprung mass of a vehicle.

17. An electromechanical generator according to claim 1, wherein the electromechanical generator is comprised in, coupled to, or mounted on an axle box for a vehicle.

18. A method of converting mechanical vibrational energy into electrical energy using an electromechanical generator, the method comprising the steps of:
providing an electromechanical generator according to claim 1, and
vibrating the electromechanical generator thereby causing the mass to oscillate about the equilibrium point relative to the body thereby causing the electromechanical generator to convert oscillations of the mass about the equilibrium point relative to the body into electrical energy.

19. An electromechanical generator for converting mechanical vibrational energy into electrical energy, the electromechanical generator comprising: a mass resiliently connected to a body by a biasing device and adapted to oscillate about an equilibrium point relative to the body, wherein the electromechanical generator is configured to convert oscillations of the mass about the equilibrium point relative to the body into electrical energy, and a spring washer disposed between the mass and the body.

20. An electromechanical generator according to claim 19, wherein the spring washer is selected from the group consisting of: a Belleville washer, a curved disc spring, a wave washer, and a split washer.

* * * * *